Patented Feb. 23, 1943

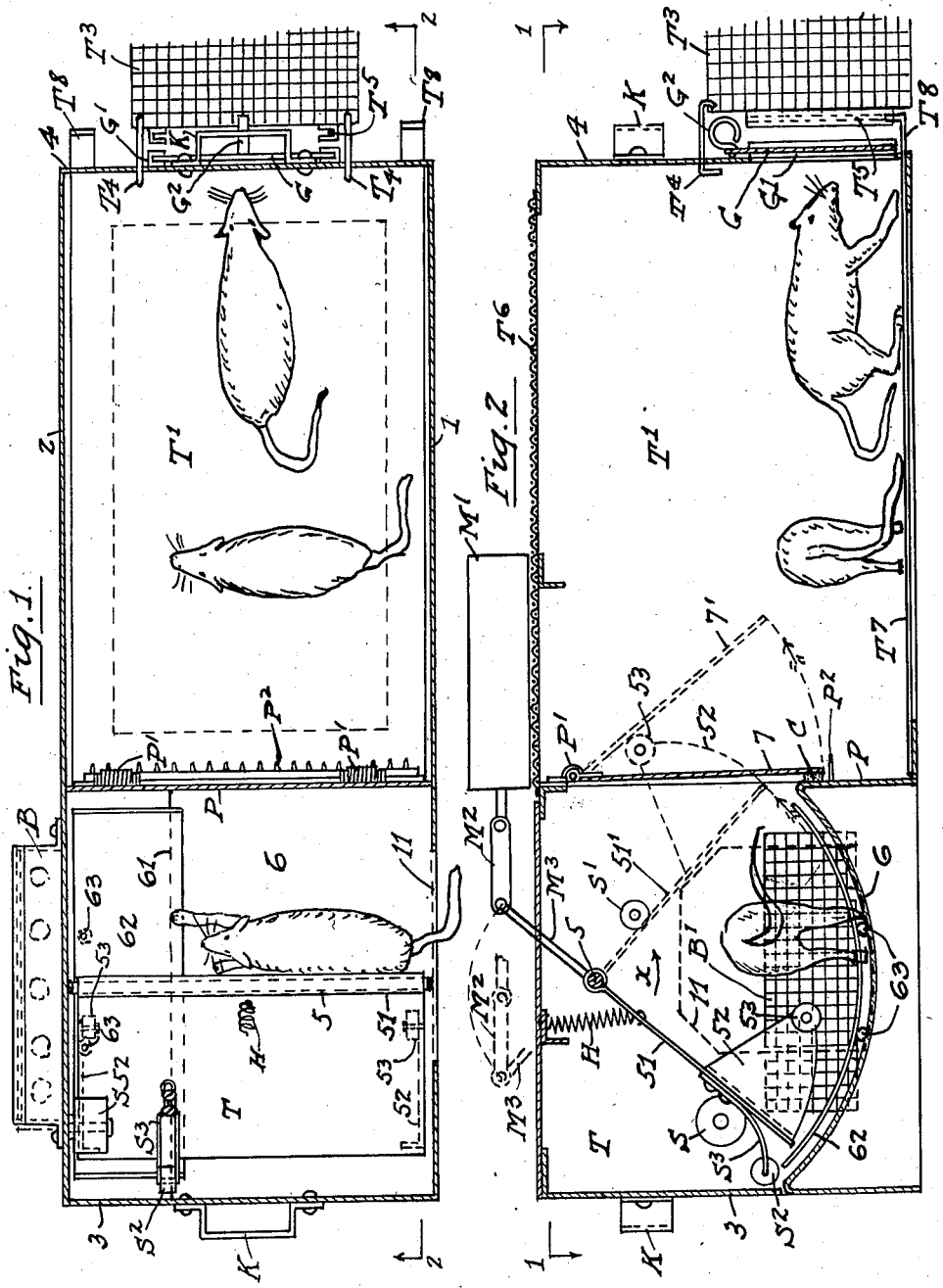

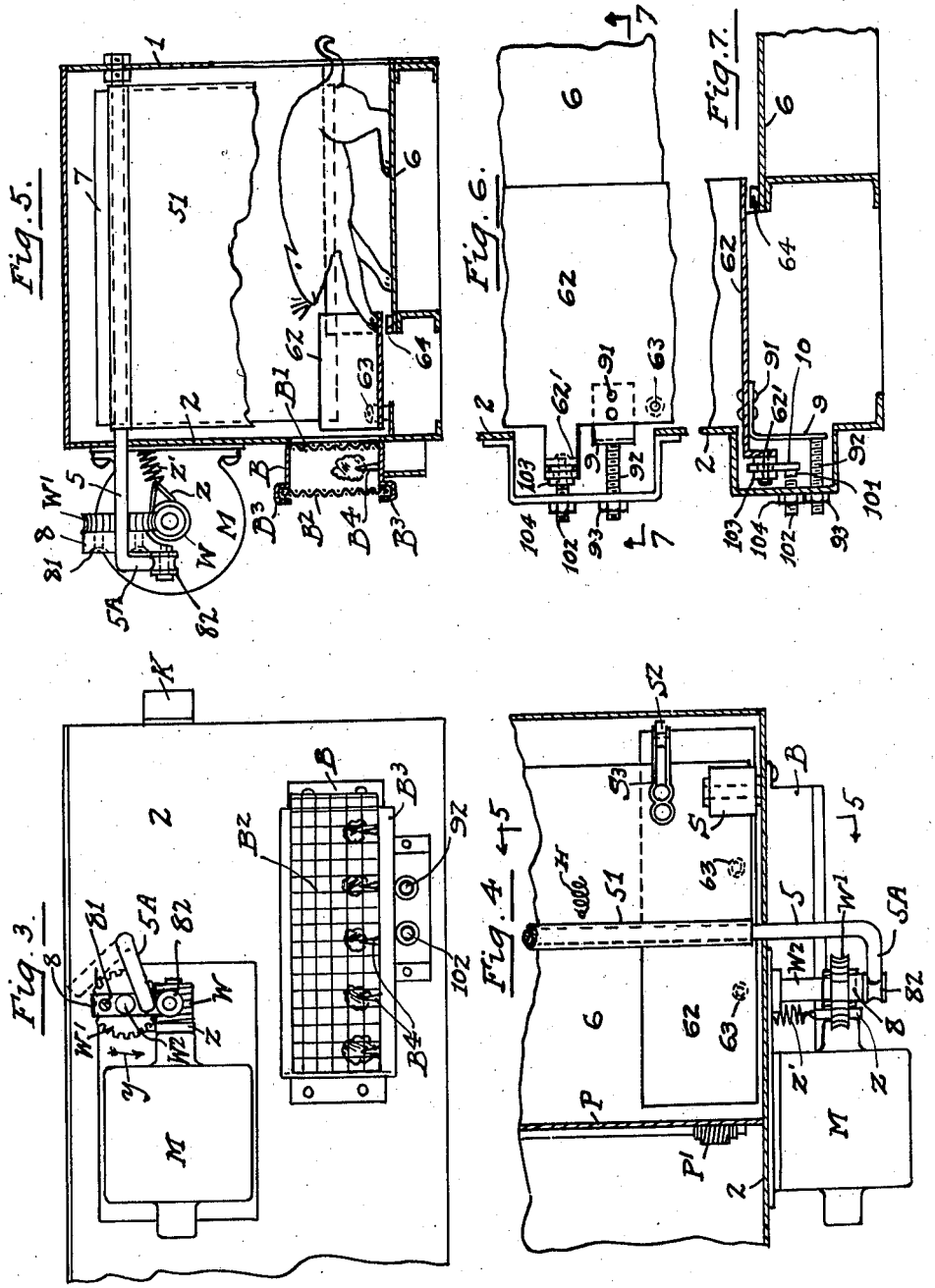

2,312,209

UNITED STATES PATENT OFFICE 2,312,209

POWER-OPERATED ANIMAL TRAP

William Colwell, Highland Park, and Charles Allen, Detroit, Mich., assignors to Pied-Piper Animal Trap Company, Detroit, Mich.

Application March 28, 1940, Serial No. 326,326

5 Claims. (Cl. 43—74)

This invention relates to animal traps and its principal object is to provide a trap which is operated by a power means so that it may catch rats and other animals continuously over a long period without attention, for which purpose the trap is provided with a catching or trap section proper and a storage section in which a large number of rats may be held pending the arrival of the attendant.

Another object of our said invention is to provide a trap in which several varieties of bait material may be employed simultaneously since it is found necessary to use different bait in different localities even with the same class of animal. The bait container in the present case is so constructed that, while it attracts the animal into the cage, the said animal has no chance to consume any of it. This further increases the period through which the trap may be left without attention.

A further object of our said invention is to provide in the storage section of the trap an exit or discharge door in conjunction with which we provide an auxiliary cage or carrier having means for connecting it to the exit end of the trap and having an entrance door which is brought into alignment with the exit door of the trap so that an animal may be transferred from the exit door to the carrier. The latter arrangement is fully shown and described in our pending application for United States patent Serial No. 309,816, filed December 18, 1939.

With these and other objects in view, we will now describe a preferred embodiment of the invention as designed for operation by means of an electric motor, reference being had to the accompanying drawings, in which—

Figure 1 is a plan view of the trap taken in section on line 1—1 of Figure 2.

Figure 2 is a front elevation of the trap, the front wall of the same, in which is located the entrance opening, being removed to show the construction of the interior mechanism.

Figure 3 is a fragmentary rear elevation showing a motor and mechanism for operating the trap, as well as the bait receptacle.

Figure 4 is a fragmentary sectional view also showing the motor and associated mechanism.

Figure 5 is a transverse section of the trap taken approximately on line 5—5 of Figure 4.

Figure 6 is a fragmentary plan view drawn to an enlarged scale showing the control means as applied to an electrically-operated trap, and Figure 7 is a fragmentary transverse section taken on line 7—7 of Figure 6.

Like characters designate corresponding parts throughout the several views.

Referring more particularly to Figures 1 and 2 of the drawings, 1, 2 designate the front and rear walls, respectively, of the trap which is of substantially rectangular shape formed chiefly from sheet metal and having end walls 3, 4. Intermediate the end walls is a partition P by which the trap is divided into a main or trap section T and a storage section T'. In the front wall 1 is an opening 11, shown clearly in the sectional view Figure 1, and in broken lines in Figure 2. This opening is large enough to conveniently admit an animal of the kind for which the trap is being constructed and is unrestricted at all times. In bearings in the front and rear walls 1, 2 is a rock-shaft 5 to which is secured a flap 51 which is capable of moving in the direction of the arrow $x$ until it reaches the position indicated at 51' in broken lines in Figure 2. Arranged concentrically with the shaft 5 is an arcuate floor 6 which extends from the front entrance 11 to a point shown in broken lines at 61, and above this floor and substantially concentric with the same is a similarly arcuate floor portion 62 which extends approximately to the rear wall of the trap and is spaced upwardly from the main floor 6. The floor portion 62 is pivotally supported at points designated 63 so that it may teeter about the said points when the animal puts his foot upon the front edge of the same, this being the means by which the trap is actuated to catch the animal, as will be further described hereinafter.

It will be seen from Figure 2 that the flap 51 almost completely sweeps the lower portion of the section T, so that a rat resting on the floor 6 can be projected, by a blow from the said flap, into the rear or storage chamber T', for which purpose there is an opening normally covered by a trap door 7, and in order to open this door at the proper time there are provided upon the flap a pair of brackets 52 carrying rollers 53 which, during the movement of the flap 51, impinge upon the door 7 and move it into the position indicated at 7' in Figure 2 so as to allow the animal to be discharged into the storage section T'.

We will now describe one method of operating the flap 51 which, in the present case, is effected by means of an electric motor M, shown clearly in Figures 3, 4 and 5, which is secured to the rear wall 2 of the trap T and carries a worm W which meshes with a worm wheel W', mounted upon a projecting stud W2, so as to rotate the same in the direction of the arrow $y$ in Figure 3 when the motor is energized by means to be hereinafter explained.

It will be noted by reference to Figure 2 of the drawings that the flap 51 is held up against a rubber stop S by means of a helical spring H one end of which is secured to the roof of the chamber while the other end is linked into the upper portion of the flap.

Secured to the face of the worm wheel as by screws 81 is an arm 8 which carries an eccentric roller 82, the said roller having an arcuate groove which engages a bent-over portion 5A upon the rock-shaft 5 in such manner that, as the worm wheel rotates, the portion 5A is raised against the action of the spring H to the position shown in broken lines in Figure 3, at which time, the worm wheel, with the roller 82, continuing to rotate, the portion 5A slips from the roller and is returned by the spring to its original position, as shown in full lines in Figure 3. During the movement just described the flap 51 has been moved to the point indicated at 51' and returned to its normal position, designated 51, this movement being sufficient to discharge a rat from the main trap portion T into the storage portion T' during the opening of the trap door 7' which has been opened in the manner above explained. Upon return of the flap 51 to its original position, the trap door is closed against the cushion C by means of the spring hinges P' by which it is secured to the partition P. A bumper S' arrests the movement of the flap at the end of its forward stroke so as to prevent it from being carried too far by inertia. Upon the partition P and below the bottom edge of the trap door 7 is a horizontal row of spikes P2 which project into the space T' and prevent trapped animals from attempting to open the door. In order to prevent over-running of the motor due to momentum of the armature after current has been cut off, there is applied a constantly operating brake which consists of a loop or strap Z passing loosely around the motor shaft and a tension spring Z¹, one end of which is attached to the two ends of the loop while the other is anchored upon the casing, all as shown in Figures 4 and 5 of the drawings.

We will now describe the operating mechanism for the motor, referring more particularly to Figures 6 and 7. Upon the floor portion 62 of the trap, which, as previously described, is arranged to teeter loosely about pivot points 63, is secured as by screws 91 a flat spring 9. This spring tends to resist the downward movement of the floor portion under pressure of the animal's foot and the strength of the spring is adjustable by means of a set screw 92 and lock nut 93 so as to approximately balance the weight of the animal's foot and secure its return to the upward position upon removal of the said foot. Upon the rear edge of the floor portion 62 is also a downwardly extending angle member 62' and to this member is secured an arm 10 which carries a contact member 101 which, upon the teetering movement of the floor portion, abuts upon the inner end of the contact member 102 so as to close the circuit of the motor, the arm 10 being insulated as by washers 103 and the usual intermediate bushing from the metal of the floor portion, and the distance between the contacts 101, 102 is adjustable by rotation of the latter which is locked by a nut 104 in the manner well known in the art. The downward movement of the member 62 is limited by a cushioned stop 64.

It will be understood from the foregoing explanation that when the rat puts his foot upon the movable member 62 the motor will start immediately and the rat will be swiftly discharged into the storage space T'. Ordinarily, the removal of the rat would cause the contacts 101, 102 to be separated and stall the motor in the middle of the cycle of operations. In order, therefore, to maintain the supply of current to the motor during a complete cycle, there is provided upon the flap 51 a roller S2 held resiliently in position by a spring S3, the said roller being adapted to press the member 62 downwardly so as to maintain the current supply as aforesaid. It will be observed from Figure 2 that this roller will keep the member 62 pressed down until the member 51 returns to its normal position as shown in full lines in the said figure.

Opposite the entrance 11 in the trap portion T of the device is a bait container B which projects outwardly from the rear wall as shown and is provided with two partitions of wire mesh B1 and B2, the partition B2 being slidable in guide members B3, as shown in Figure 5. Between these partitions is located a series of pins B4 which carry the bait. Thus various types of bait may be impaled upon the pins but can in no way be reached by the animal, but merely serve to attract him, being visible from the rear of the cage as well as from the entrance opening. The trap is provided with handles K by which it may be transported from place to place, and in order to remove the trapped animals there is provided a vertical gate G which is slidably supported in guides G1 secured to the end of the cage, there being a handle G2 for manipulating the gate. In order to remove the trapped animal from the storage space T' without danger of soiling the hands or acquiring disease germs, we have provided, as shown in Figures 1 and 2, an auxiliary cage or carrier T3 which may be temporarily secured to the trap as by hooks T4 which engage the openings in the end wall of the trap. This cage is provided with a gate, not shown, which works in guides T5 similar to those upon the end of the trap. The roof of the storage space T' is made from wire netting T6, as shown in Figure 2, so that the animals entrapped can be observed by the operator, and the bottom T7 of this section of the trap is arranged to slide outwardly for the purpose of cleaning, being manipulated by the handles T8 and held in position by means well known in the art.

It will be observed from the foregoing description and by reference to the drawings that we have provided a simple and efficient apparatus for the purpose set forth, and while we have herein shown and described a preferred embodiment of our invention, it will be obvious to those skilled in the art to which the same pertains that various modifications may be made in detail without departing from the spirit of the invention as defined in the appended claims. For example, instead of employing the rotary motor designated M, we may employ any other form of power such as, for instance, a magnet or solenoid such as indicated at M' in Figure 2, the core of the said solenoid being connected as by the links M2 to an arm M3 which is secured to the rock-shaft 5, the means for controlling the current to the solenoid being practically the same as that hereinbefore described. Alternately, the member designated M' may be any form of pressure cylinder, the piston of which is connected by the links M2 to the arm M3, pressure into the cylinder being controlled by suitable valves operated by the movable floor member 62, The arrangement of the valves and connections in this modification are so simple and well known in the art that it is not deemed necessary to describe them further herein.

Having thus described our said invention, what we claim and desire to secure by Letters Patent of the United States is:

1. An animal trap comprising a main catching section having a permanent entry opening, a bait-displaying chamber opposite said opening, a storage section adjacent said main section, a spring-closed door intermediate said main and storage sections, and means for opening said door and for projecting an animal into said storage section, said means comprising a rock-shaft, a flap mounted upon said rock-shaft and adapted to propel an animal towards said door, electrical power means for oscillating said shaft, and switch means actuated by an animal entering said catching section for energizing said power means.

2. An animal trap comprising a main catching section having a permanent entry opening and a bait-displaying chamber, a storage section connected with said main section, a spring-closed door intermediate said sections, and power-operated means for projecting an animal from said main section into the storage section, said means comprising a rock-shaft, a flap mounted upon said rock-shaft and adapted to propel an animal towards said door, a fixed arcuate floor section arranged concentrically with said rock-shaft and positioned therebelow, a movable arcuate floor section pivotally connected for vertical movement and spaced above said fixed section, means actuated by said rock-shaft for opening said door, power-operated means for oscillating said shaft, and power-controlling means actuated by depression of said movable floor.

3. An animal trap comprising a main catching section having a permanent entry opening and a bait-displaying chamber, a storage section connected with said main section, a spring-closed door intermediate said sections, and power-operated means for projecting an animal from said main section into the storage section, said means comprising a rock-shaft, a flap mounted upon said rock-shaft and adapted to propel an animal towards said door, a fixed arcuate floor section arranged concentrically with said rock-shaft and positioned therebelow, a movable arcuate floor section pivotally connected for vertical movement and spaced above said fixed section, means actuated by said rock-shaft for opening said door, motor-operated means for oscillating said shaft, and power-controlling means actuated by depression of said movable floor, said last-named means comprising resilient means for holding said movable floor in its upward position when unloaded, an arm movable therewith and having an insulated contact, and a fixed contact arranged in cooperative relation with said movable contact whereby depression of said floor causes current to be supplied to said motor means.

4. An animal trap comprising a main catching section having a permanent entry opening, a bait-displaying chamber opposite said opening, a storage section adjacent said main section, a spring-closed door intermediate said main and storage sections, and means for opening said door and for projecting an animal into said storage section, said means comprising a rock-shaft, a flap mounted upon said rock-shaft, spring means for moving said flap backwards, and means for moving said flap forwards against the action of said spring, said means including a motor, a worm driven by said motor, a worm wheel meshing with said worm, a crank arm rotatably driven by said worm wheel, a roller eccentrically mounted upon said crank arm, a bent-over portion upon said rock-shaft arranged in the path of said roller and operated thereby through a predetermined distance and then released, and switch means actuated by an animal entering said trap for supplying current to said motor.

5. An animal trap comprising a main catching section having a permanent entry opening, a bait-displaying chamber opposite said opening, a storage section adjacent said main section, a spring-closed door intermediate said main and storage sections, and means for opening said door and for projecting an animal into said storage section, said means comprising a rock-shaft, a flap mounted upon said rock-shaft, spring means for moving said flap backwards, and means for moving said flap forwards against the action of said spring, said means including a motor, a worm driven by said motor, a worm wheel meshing with said worm, a crank arm rotatably driven by said worm wheel, a roller eccentrically mounted upon said crank arm, a bent-over portion upon said rock-shaft arranged in the path of said roller and operated thereby through a predetermined distance and then released, switch means actuated by an animal entering said trap for supplying current to said motor, and means actuated by said rock-shaft for maintaining said switch means in contact during a complete cycle.

WILLIAM COLWELL.
CHARLES ALLEN.